US011017005B2

(12) United States Patent
Meling et al.

(10) Patent No.: US 11,017,005 B2
(45) Date of Patent: *May 25, 2021

(54) FILTERING COMMUNICATIONS

(71) Applicant: Microsoft Technology Licensing, LLC, Redmond, WA (US)

(72) Inventors: Jon Meling, Redmond, WA (US); Berit Herstad, Oslo (NO); Ashok Kuppusamy, Mercer Island, WA (US); Jeremy Grubaugh, Kirkland, WA (US)

( * ) Notice: Subject to any disclaimer, the term of this patent is extended or adjusted under 35 U.S.C. 154(b) by 403 days.

This patent is subject to a terminal disclaimer.

(21) Appl. No.: 15/871,286

(22) Filed: Jan. 15, 2018

(65) Prior Publication Data
US 2019/0220541 A1    Jul. 18, 2019

(51) Int. Cl.
| | |
|---|---|
| *G06F 16/00* | (2019.01) |
| *G06F 16/338* | (2019.01) |
| *G06Q 10/10* | (2012.01) |
| *G06F 16/33* | (2019.01) |
| *G06F 16/335* | (2019.01) |
| *H04L 12/58* | (2006.01) |
| *G06F 3/0482* | (2013.01) |

(52) U.S. Cl.
CPC .......... *G06F 16/338* (2019.01); *G06F 16/334* (2019.01); *G06F 16/335* (2019.01); *G06Q 10/107* (2013.01); *H04L 51/04* (2013.01); *H04L 51/22* (2013.01); *G06F 3/0482* (2013.01); *H04L 51/16* (2013.01)

(58) Field of Classification Search
CPC combination set(s) only.
See application file for complete search history.

(56) References Cited

U.S. PATENT DOCUMENTS

| | | | |
|---|---|---|---|
| 8,065,369 B2 | 11/2011 | Turski et al. | |
| 8,627,222 B2 | 1/2014 | Hartwell et al. | |
| 9,705,885 B2 | 7/2017 | Erdal | |
| 2004/0068695 A1 | 4/2004 | Daniell et al. | |
| 2005/0262203 A1* | 11/2005 | Buchheit | G06F 16/24 |
| | | | 709/206 |

(Continued)

OTHER PUBLICATIONS

"Add or remove folders in Favorites", Retrieved From <<https://support.office.com/en-us/article/Add-or-remove-folders-in-Favorites-8913f2d0-b167-48cc-8983-86fa9b0d945f#ID0EBABAAA=2016,_2013>>, Retrieved on: Nov. 16, 2017, 3 Pages.

(Continued)

*Primary Examiner* — Ashish Thomas
*Assistant Examiner* — Suman Rajaputra
(74) *Attorney, Agent, or Firm* — Shook, Hardy & Bacon, LLP

(57) ABSTRACT

A method comprising: accessing a record of past emails or IM messages between a first user and a plurality of other users; from amongst a set of entities (e.g. other users, user groups or folders), identifying a subset as preferred entities of the first user, wherein at least some of the preferred entities are identified automatically based on at least a frequency of interaction between the first user and each of the entities; independently of receiving any search queries, causing a graphical user interface to display a list of the preferred entities; and based on the first user selecting one of the entities from the list, causing the graphical user interface to display to the first user a filtered-down list of emails and IM messages, being some or all of the emails or IM messages communicated between the first user and the selected entity.

20 Claims, 2 Drawing Sheets

(56) References Cited

U.S. PATENT DOCUMENTS

| | | | |
|---|---|---|---|
| 2006/0112081 A1 | 5/2006 | Qureshi | |
| 2006/0277210 A1 | 12/2006 | Starbuck | |
| 2007/0061306 A1 | 3/2007 | Pell et al. | |
| 2007/0061307 A1 | 3/2007 | Hartwell et al. | |
| 2007/0203991 A1 | 8/2007 | Fisher et al. | |
| 2008/0077571 A1 | 3/2008 | Harris et al. | |
| 2008/0114761 A1 | 5/2008 | Gross et al. | |
| 2010/0169320 A1 | 7/2010 | Patnam et al. | |
| 2015/0172245 A1* | 6/2015 | Spivey | H04L 51/16 715/752 |
| 2015/0186478 A1* | 7/2015 | Yan | G06F 16/24578 707/722 |
| 2015/0200878 A1* | 7/2015 | Shih | H04L 67/42 709/206 |
| 2017/0054667 A1 | 2/2017 | Brown et al. | |
| 2017/0063767 A1 | 3/2017 | Lukas et al. | |
| 2018/0006983 A1 | 1/2018 | Steplyk et al. | |
| 2018/0196822 A1 | 7/2018 | Lewin-eytan et al. | |
| 2019/0220540 A1 | 7/2019 | Meling et al. | |

OTHER PUBLICATIONS

"Adding a Public Folder to Your Favorite Folders in Outlook", Retrieved From <<https://conetrix.com/Blog/adding-a-public-folder-to-your-favorite-folders-in-outlook>>, Oct. 26, 2007, 5 Pages.

"How to Add Contacts to Favorites in Outlook?", Retrieved From <<https://www.extendoffice.com/documents/outlook/2069-outlook-add-contacts-to-favorites.html>>, Retrieved on: Nov. 16, 2017, 8 Pages.

"Search Mail and People in Outlook.com", Retrieved From <<https://support.office.com/en-us/article/Search-Mail-and-People-in-Outlook-com-and-Outlook-on-the-web-for-business-88108edf-028e-4306-b87e-7400bbb40aa7?ui=en-US&rs=en-US&ad=US#bkmk_refinesearch>>, Retrieved on: Nov. 16, 2017, 9 Pages.

Kissell, Joe, "How to search smarter in Mail", Retrieved From <<https://www.macworld.com/article/2142029/how-to-search-smarter-in-mail.html>>, Apr. 14, 2014, 14 Pages.

Screenshot of Web-based Outlook e-mail client generated Jan. 4, 2018, 1 page.

Screenshot of Outlook e-mail client generated Jan. 4, 2018, 1 page.

"Non Final Office Action Issued in U.S. Appl. No. 15/871,263", dated May 31, 2019, 15 Pages.

"International Search Report and Written Opinion Issued in PCT Application No. PCT/US18/065307", dated Mar. 20, 2019, 14 Pages.

"International Search Report and Written Opinion Issued in PCT Application No. PCT/US18/066985", dated Mar. 11, 2019, 12 Pages.

"Final Office Action Issued in U.S. Appl. No. 15/871,263", dated Dec. 12, 2019, 18 Pages.

* cited by examiner

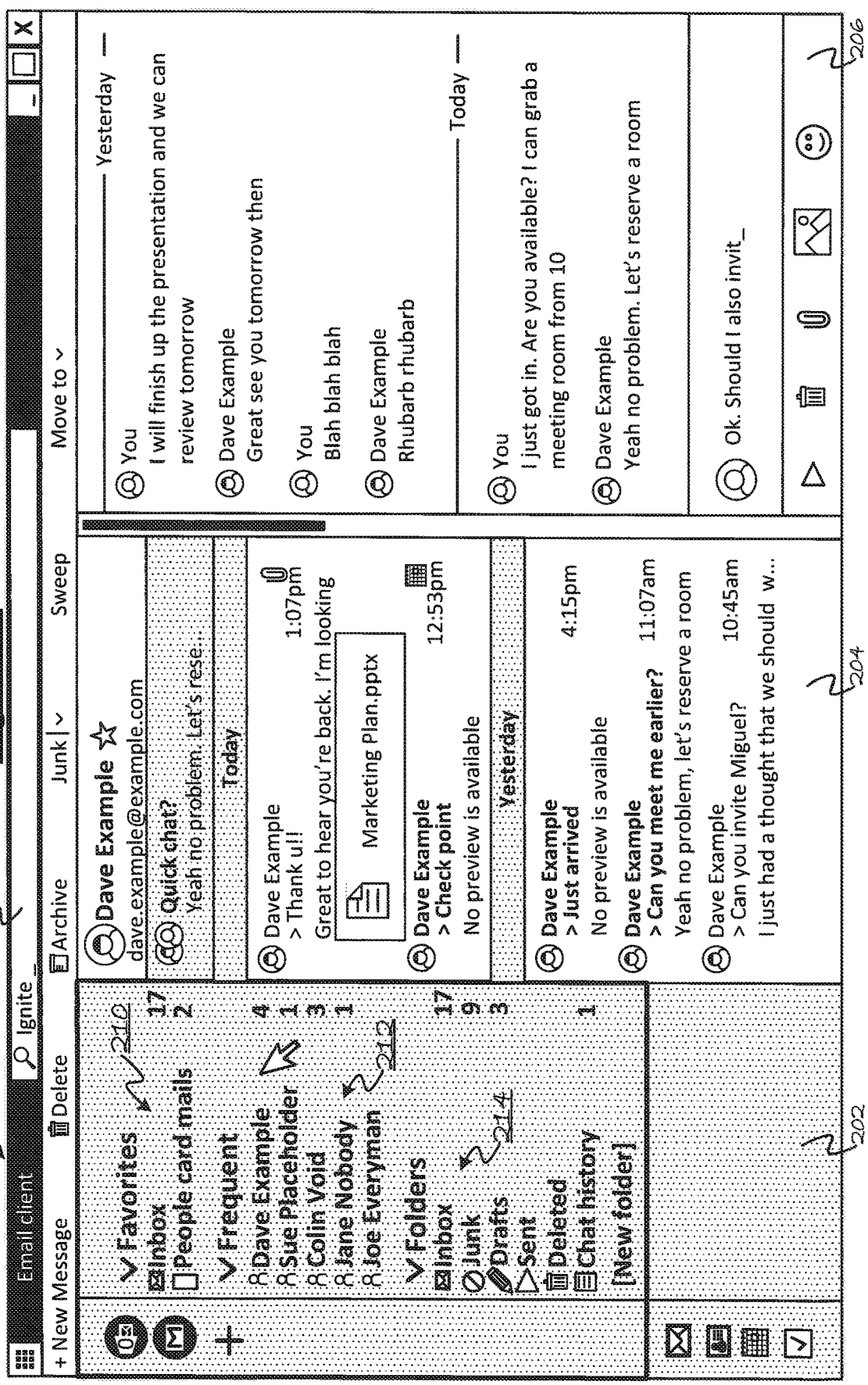

FILTERING COMMUNICATIONS

TECHNICAL FIELD

The present disclosure relates to filtering-down emails and/or instant messaging (IM) messages from amongst a larger number in a stored record.

BACKGROUND

Email in itself is a well-known form of communication. When a first user wishes to send an email to a second user, the first user composes an email using an email client installed and run on his/her user terminal. The email client sends the outgoing email from the first user's terminal to a mail server of the first user, which forwards the email to a mail server of the second user, which in turn forwards it to an email client on a user terminal of the second user's terminal. A similar, reciprocal process occurs when the second user or other users send emails to the first user. In variants of the above, web-hosted clients are also now known.

Typically a record of sent and received emails is stored either at the first user's mail server or at the first user's own terminal, or both. The first user can search these using a search tool having a front-end user interface provided through the first user's terminal, e.g. in the first user's email client. The back-end functionality of the search function may be implemented in the mail client, the server, or a combination of these.

Somewhat similarly for IM messages, when a first user wishes to send an IM message to a second user, he/she composes an IM message on an IM client on his/her user terminal (or a web-hosted client). The IM client could be the same application as the email client or a different application. The IM client sends the message to an IM server operated by the provider of the IM system, which forwards it to an IM client of the second user on the second user's terminal (or to a web-hosted client). The reverse process occurs when the second user or another user wishes to send an IM message to the first user. Again a record of sent and received IM messages is typically stored, either at the IM server or on the first user's terminal, or both. The first user can search these past IMs using a search tool having a front-end user interface on the first user's terminal, e.g. in his/her IM client (and back-end search functionality implemented on the first user's terminal, the IM server or a combination).

However, there remains a difficulty when a user is searching the record of his/her past communications, in that over time the record typically becomes very large, with communications to and from a large number of other users. This means that even narrowing down to a particular search term or terms may return a large number of results, defeating the utility of the search.

SUMMARY

According to a first aspect of the present disclosure, there is provided a method comprising: accessing a record of past communications between a first user and a plurality of other users, the communications comprising emails or IM messages; and making the emails or IM messages available to be searched by receiving search queries from the first user. The method further comprises, from amongst a group of entities (e.g. the other users), identifying a subgroup as preferred entities of the first user. At least some of the preferred entities are identified as preferred entities automatically based on one or more factors including at least a frequency of interaction between the first user and each of the entities, the entities with which the first user has a greater frequency of interaction being given a greater preference in said automated identification. Independently of receiving any search queries, the method also causes a graphical user interface to selectively display a list of the preferred entities distinguishing them from amongst the rest in the group. Based on the first user selecting one of the entities from the list, the graphical user interface is caused to display to the first user a filtered-down list of the emails and IM messages from said record, the emails or IM messages of said filtered-down list being some or all of the emails or IM messages communicated between the first user and the selected entity.

The list of preferred entities (e.g. other users, user groups or folders)—also referred to herein as "dynamic favourites"—advantageously provides the first user with a mechanism for readily filtering down to those items that are more likely to be relevant to him/her, without the first user having to perform a complex sequence of navigation steps. For example in embodiments the list may be always present in a left-hand navigation pane of the graphical user interface. The first user can perform a single user action, i.e. selecting one of the dynamic favourites from the left-hand pane, and in response to this single user action, a preview of some or all of the emails or IM messages specifically for that entity (e.g. to/from a particular other user or group, or in a particular folder) will be immediately summoned in a right-hand preview pane.

The word "or" herein should be taken to mean "and/or" (as opposed to exclusive or). Hence in embodiments the communications in question may be only emails, only IM messages, or a combination of emails and IM messages. Note also that the recited order of the steps does not imply a chronological or causal order unless otherwise stated.

In embodiments, the method may comprise receiving one of said search queries from the first user. In embodiments the emails or IM messages of said selection may be search results corresponding to the received search query. In such embodiments the list of preferred entities is displayed prior to the received search query being entered by the first user.

In embodiments the method may also comprise: in response to the receipt of the received search query, automatically causing the user interface to display, simultaneously in association with each respective one of the preferred entities in said list, a separate respective numerical count of search results found for the respective entity based on the received search query, the search results comprising identified ones of the emails or IM messages corresponding to said one of the search queries.

Thus for a given search query, individual counts of the corresponding search results are displayed in parallel for each of the preferred entities (e.g. frequently contacted other users or user groups).

At least some of the preferred entities are selected automatically based at least in part on the frequency of interaction. E.g. where the entity is another user or user group, the frequency of interaction may be a number of past emails sent between the first user and the party. Or where the entity is a folder, the frequency of interaction may be the number of times the first user has accessed the folder in question.

In embodiments at least some of the entities are different respective parties each comprising one or more of said other users. In this case the search results for the respective entity are communications to and/or from the respective party. One or more of the parties may be individual ones of said other users. And/or, one or more of the parties may be groups of multiple of said other users. The communications may be stored in one or more folders, and the search results for some or all of the parties may originate from the same folder, but the respective counts may nonetheless be displayed separately in said list without copying the search results to another folder.

The communications in said record may be stored amongst a plurality of folders, and the search results may be found from amongst multiple of the folders.

In embodiments, at least some of the entities may be different respective folders. In this case the search results for the respective entity are found in the respective folder. In some such embodiments the different folders may include at least one user-defined folder to which emails are forwarded according to a user-defined rule defined by the first user. For instance the folder may relate to a certain project in which the first user is involved, e.g. the rule being to forward or copy all emails with a certain word or words in the title, or in the title or body.

The receiving of the search query could be via said graphical user interface or by other means, e.g. a voice interface employing speech recognition to receive search queries.

The count may include only unread (un-viewed) communications, or both read and unread communications.

In embodiments, when one of the entities is selected from the list by the first user, the graphical user interface may display a preview of the respective search results (e.g. in chronological order, preferably most recent first). In embodiments this may comprise displaying only unread communications, or both read an unread. In the latter case, preferably the unread communications are displayed more prominently (with greater emphasis) than the read communications (e.g. highlighted and/or with titles in bold).

In embodiments, the graphical user interface may comprise a navigation pane (e.g. left-hand navigation pane) and at least one preview pane separate from the navigation pane (e.g. to the right of the left-hand navigation pane), the list of preferred entities being displayed in the navigation pane and the preview being displayed in the preview pane. Where relevant the associated counts may also be displayed in the navigation pane alongside the respective entities in said list. In embodiments, the preview of the emails may be displayed in a separate preview pane than the IM messages.

The preview may comprise any suitable indication of the relevant emails or IM messages, e.g. part or all of their title, body content or both. For instance in some cases the preview could comprise just a title, or just a fragment of the content, or it may comprise both the title and a fragment of the content.

In embodiments, one or more of the preferred entities may be identified as such manually by the first user.

In embodiments, the one or more factors (upon which the automated identification is based) may further comprise a hierarchical status of the entity (e.g. status within an organization such as a company).

According to a second aspect disclosed herein, there is provided a method comprising: accessing a record of past communications between a first user and a plurality of other users, the communications comprising emails or IM messages; receiving a search query from the first user; from amongst a set of entities, identifying a subset as preferred entities of the first user; causing a graphical user interface to selectively display a list of the preferred entities distinguishing them from amongst the rest in the set; in response to the receipt of the received search query, automatically causing the graphical user interface to display, simultaneously in association with each respective one of the preferred entities in said list, a separate respective numerical count of search results found for the respective entity based on the received search query, the search results comprising identified ones of the emails or IM messages corresponding to said one of the search queries; and based on the first user selecting one of the entities from the list, causing the graphical user interface to display to the first user a filtered-down list formed from some or all of the search results for the selected entity.

In embodiments of this second aspect, in embodiments at least some of the preferred entities may be selected manually by the first user as preferred entities. In such embodiments, the method may comprise enabling the user to select any desired arbitrary combination of the entities from said set as the manually-selected preferred entities.

Alternatively or additionally, at least some others of the preferred entities may be identified automatically based on one or more factors. E.g. said one or more factors may include at least a frequency of interaction between the first user and each of the entities, the entities with which the first user has a greater frequency of interaction being given a greater preference in said automated identification.

In embodiments of the second aspect, the list of preferred entities and associated counts may be displayed in a left-hand navigation pane of the graphical user interface, whilst the filtered-down list may be displayed separately in a separate preview pane to the right of the navigation pane in the graphical user interface.

The first and second aspects may be used together or independently. In embodiments of the second aspect, the method may further comprise steps or features from any of the embodiments of the first aspect, or vice versa.

According to another aspect disclosed herein, there is provided a computer program embodied on computer readable storage (comprising one or more storage devices employing one or more storage media) and configured so as when run on a processing apparatus (comprising one or more processing units) to perform operations in accordance with any of the above-mentioned methods or any other embodiments disclosed herein.

The code may be run on the user terminal, or on a server (comprising one or more physical server units at one or more geographic locations), or may be distributed between the user terminal and a server.

According to another aspect disclosed herein, there is provided a computer system comprising storage (comprising one or more storage devices employing one or more storage media) and processing apparatus (comprising one or more processing units), wherein the storage stores code arranged to run on the processing apparatus and configured so as when thus run to perform operations in accordance with any of the above-mentioned methods or any other embodiments disclosed herein.

The storage and/or processing apparatus may be implemented entirely on the user terminal of the first user, or entirely on a server, or may be distributed between the user terminal and a server.

In the case of a server-based implementation, the operations of causing the user interface to display may be implemented by sending suitable commands from the server to the user terminal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of parts of the present disclosure and to show how embodiments may be put into effect, reference is made, by way of example only, to the accompanying drawings in which:

FIG. 2 is a schematic mock-up of a user interface.

DETAILED DESCRIPTION OF EMBODIMENTS

Figure 1:
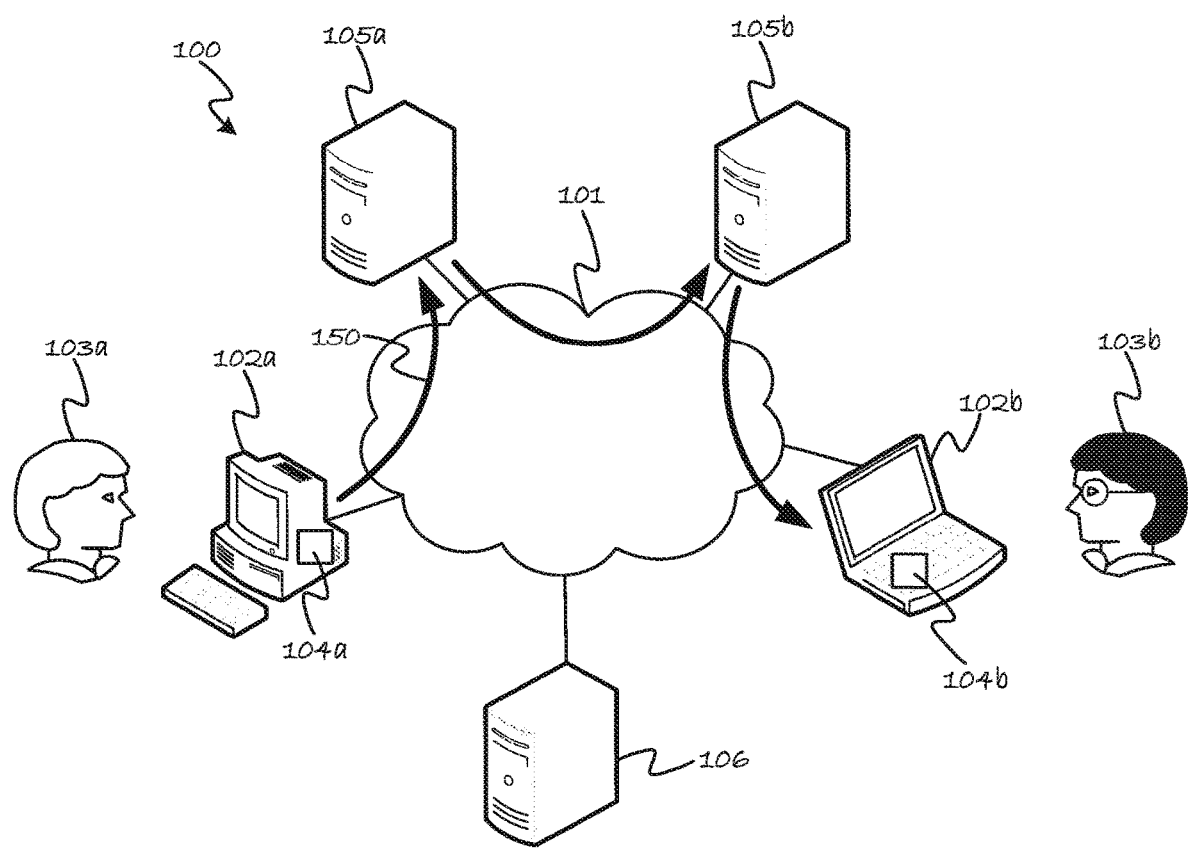
FIG. 1 is a schematic block diagram of a communication system.

People receive thousands of emails every month and re-finding a specific email using a conventional search can be a cumbersome task. People are currently using different strategies to stay up to date on their email. Some use folders and rules, while others delete emails once they have consumed them. The present disclosure provides a model whereby the system automatically recommends and displays the people and/or folders the user is currently working with, so that he/she can easily stay on top new messages coming from them. Alternatively or additionally, the user is provided with the ability to assign favourites or VIPs, e.g. in the top left of their email client's user interface.

In embodiments, when a user searches for a term, the presently-disclosed search functionality does not just provide him/her with a flat list (sorted by recency) of all items (emails and attachments) that contain the search term. Instead, if frequent people or folders have been identified for the user, or if the user has added people, groups and folders to his/her favourites or "VIP" list, then for each of these, the user interface in his/her client application shows the number of items in which the search term appears. In this way the user is guided to find the email he/she is looking for quicker. A similar system can be implemented for IM messages.

FIG. 1 illustrates an example communication system 100 in which the presently-disclosed techniques may be deployed.

The system 100 comprises a packet-switched computer network 101 comprising one or more constituent networks. For instance the network 101 may comprise a wide-area internetwork such as that commonly referred to as the Internet. Alternatively or additionally, the network 101 may comprise a local area network such as a company intranet. The system 100 further comprises a plurality of user terminals 102, each connected or operable to connect to the network by suitable wired or wireless means (e.g. wired modem or Wi-Fi connection). Each user terminal 102 is used by a respective user 103. Each user terminal 102 may take any of a variety of possible forms, e.g. a static user terminal such as a desktop computer, or a portable user terminal such as a smartphone, tablet or laptop. First and second user terminals 102a, 102b and their respective first and second users 103a, 103b are shown in FIG. 1 for illustrative purposes, but it will be appreciated that many more users and their terminals 102 may in fact be involved in the described scenarios.

The system further comprises one or more mail servers 105, and/or one or more IM servers 106. Note that a server herein refers to a logical entity provided by a given service provider or to provide a given service, wherein the server may be implemented by one or more physical server units located at one or more geographical sites. The following is described in terms of a mail server 105a of the first user 103a and a mail server 105b of the second user 103b, though it is not excluded that the mail service of the first and second users 103a, 103b could in fact be provided by the same mail server (same provider or service).

Each user 103a, 103b has a respective email client application 104 installed in his/her respective user terminal 102a, 102b. To send an email 150 to another user such as the second user 103b, the first user 103a composes an email using the client 104a on his/her terminal 102a. When the first user selects to send the email, the first client 104a then sends the email 150 to the first user's mail server 105a for delivery. The first mail server 105a forwards the email to the mail server 105b of the second user 103b, and when the second user's terminal 102b is online and running the second client 104b, then the second user's mail server 105b delivers the email 150 to the second client 104b on the second user terminal 102b. The reverse process occurs mutatis mutandis when another user such as the second user 103b sends an email to the first user 103a. In variants of the above, one or both of the users could instead use a server-hosted client instance accessed from a general purpose client application run on the respective user's terminal 102, e.g. a web-hosted client accessed through a web browser. The web-hosted client or other such server-hosted client could be hosted on the user's respective mail server 105a m 105b, or another server (not shown).

When the first user 103a sends or receives an email, it is stored in a record (log) which may be stored on the first user's own user terminal 102a, or the first user's mail server 105a, or another server (not shown), or any combination of these.

In embodiments the email client 104 is also capable of sending and receiving IM messages, so as to also act as an IM client. Or in other embodiments one or both user's has a separate IM client application stored on his/her respective terminal 102a, 102b. Either way, in embodiments the first user 103a can thus send and receive IM messages to/from other users such as the second user 103b. These IM messages are exchanged via a central IM server 106. I.e. the relevant client 104a on the first user's terminal 102a sends an IM message to the IM server 106, which forwards to the client 104b on the second user's terminal 102a when online, or vice versa. Again, web-hosted clients are also possible for one or both of the first and second user's 103a, 103b, wherein the web-hosted client could be hosted on the respective IM server 106 or another server (not shown).

When the first user 103a sends or receives an IM message, it is stored in a record (log) which may be stored on the first user's own user terminal 102a, the IM server 106, or another server (not shown), or any combination of these.

FIG. 2 illustrates an example graphical user interface (GUI) 200 provided by the email client 104a on the first user's terminal 102a, or by an equivalent web-hosted client, in accordance with embodiments disclosed herein. The graphical user interface 200 may for example take the form of a point-and-click interface operated via a mouse, touchpad, tracker ball or the like, or a touch screen interface. Note that "graphical" user interface as referred to herein does not exclude the use of text in the interface, nor the use of textual elements as the selectable elements.

The system 100 comprise a search function which may be implemented as part of the first user's client 104a on the first user terminal 102a, or the first user's mails server 105a or IM server 106, or another server (not shown), or any combination of these.

The user interface 200 of the first client 104a comprises means such as a search bar 208 enabling the first user 103a to enter a desired search query, in the form of a word or words for which the first user 103a wishes to find emails containing matching content. In alternative variants, the search query may be entered by other means, e.g. though a voice interface employing voice recognition to allow the first user to enter the search query orally. This voice interface could be implemented as part of the first client 104a, or another application on the first user terminal 102a, or even on another user device such as a smart speaker.

By whatever means received, the received search query is passed to the search function. The search function is configured to access the record of past emails and/or IMs having been sent from the first user 103a to a plurality of other users such as the second user 103b in the manner described above, and/or received by the first user 103b from other users such as the second user 103b in a similar, reciprocal manner. The search function accesses this record from the relevant storage on the first user terminal 102a, first mail server 105a, IM server 106 and/or or other server (not shown). The search function is thus able to access the record or log of the first user's past communications (emails and/or IM messages) for search purposes, in order to search amongst them to find instances (the search results) that match a search query of the first user 103a. Note that a "match" as referred to herein does not necessarily have to require an exact verbatim match in all possible embodiments (though that may be a requirement in some embodiments). In other embodiments a match may also allow for, e.g. spelling mistakes, or synonyms. In some cases natural language processing (NLP) or machine learning techniques could be employed to search for emails and/or IMs having content that is estimated to match the user's search query in underlying substance.

In embodiments the stored communication, or at least the emails, are stored amongst a plurality of different folders. A list of these folders 214 may be displayed in the user interface 200. In embodiments, the user interface 200 is divided into a plurality of panes: a left-hand pane 202 and one or more right-hand panes, 204, 206 located to the right of the left-hand pane 202. The list of folders 214 is typically included in the left-hand pane 202, whereas a sub-list of the emails in a selected one of the folders is displayed a right-hand pane 204, 206. The left-hand pane 202 may be the navigation pane. The sub-list may take the form of previews displayed in a right-hand preview pane 204, 206.

In accordance with embodiments disclosed herein, the user interface 200 provided through the client 104a uses a mechanism referred to herein as "dynamic favourites" to allow people to effortlessly stay on top of the people or subjects that matter the most to them. This means that in addition to (or instead of) the flat list of all folders 214, the user interface 200 additionally (or alternatively) displays a separate list of a subset of the people, user groups and/or folders 212 the first user 103a interacts with. Thus these entities 212 are distinguished in the UI 200 from amongst the set of all those the user has interacted with in the past (which may or may not also be displayed separately in the main list 214). This subset 212 is automatically and dynamically determined by the search function as those people, groups or folders preferred for or by the first user 103a (relative to others of the people or user groups the first user 103a has previously communicated with by email or IM, or relative to others of the folders that at least some of the emails or IM messages are stored in, respectively). These people, groups or folders may be referred to herein as automated favourites, or "dynamic favourites". The automated decision as to whether to promote a person, user group or folder to the status of dynamic favourite is based at least in part on a frequency of interaction between the first user 103a and the person, group or folder in question. So for people (e.g. the second user 103b), the people under the dynamic favourites or "Frequent" list 212 are the ones the first user 103a communicates with most. These are elevated so that the first user 103a can effortlessly stay up-to-date on incoming messages from the people he/she interacts with most. These will change as the first user's communication patterns change.

For people (other users) or user groups, the frequency of interaction of the first user 103a with a given person or group may for example be measured based on the number of past emails the first user 103a has communicated to and/or from the person or group in question within a predetermined time window (e.g. the last week or month), or the number of past IM messages the first user 103a has communicated to and/or from that person or group in the predetermined window, or the total number of emails and IM messages the first user 103a has communicated to and/or from the person or group in the predetermined time window. Alternatively or additionally (i.e. with or without limiting to a certain predetermined time window), for each person or group, a more complex metric measuring the frequency or interaction may be evaluated by, e.g.: assigning an individual score to each past email and/or IM to and/or from that person or group, weighted with diminishing weight according to the age of the email or IM message, then combining (e.g. summing) the individual scores for the emails and/or IM messages to and/or from the person or group in question.

For folders, a similar kind of measure may be defined. That is, the frequency of interaction between the first user 103a and a given folder may be determined based on the number of times the first user 103a has accessed that folder within a predetermined time window. And/or, a more complex metric may be used which weights each access by the time elapsed since that access.

In embodiments, the determination as to which are dynamic favourites may be based only on the measure of frequency of interaction. Alternatively one or more additional factors may also be taken into account. For example, people having a greater hierarchical status than others (e.g. their status within an organization such as that which employs the first user 103a) may be weighted more strongly in determining the dynamic favourites than those having a lower status in the hierarchy (e.g. lower status within the organization). For instance the first user's boss or supervisor may be given a greater weighting than his/he peers or underlings.

The dynamic favourites list 212 may be displayed in the left-hand pane 202 along with, but separately from, the main (flat) folders list 214.

In addition to the dynamic favourites 212, or as an alternative, in embodiments the user interface 200 enables the first user 103a to manually select on to more user-selected favourites, or "VIPs". Again these can be people, groups and/or folders. The user-selected favourites are displayed in a list 210 in the user interface 200, separately from the main folder list 214 and from the dynamic favourite list 212. Preferably the first user can freely select any desired combination of favourites.

As well as displaying the favourites list(s) 212, 214, or as an alternative to this, in embodiments the search function of the present disclosure provides another feature. That is, via the user interface 200, there is provided a "parallel searching" feature which enables the first user 103a to simultaneously search for search results for each of multiple of the dynamic favourites 212 and/or user-selected favourites 210 in parallel, with a separate indication of the number of respective search results for each favourite being separately displayed for each in parallel. So for people or groups, a separate indication of the number of emails and/or IM messages to and/or from the person or group which match the entered search criterion is displayed in association with the respective entry in the relevant favourites list 210, 212, simultaneously in parallel for some or all of the people or groups in the list(s) 210, 212. Similarly for folders, a separate indication of the number of emails and/or IM messages found in the respective folder matching the entered search criterion is displayed in association with the respective entry in the relevant favourites list 210, 212, simultaneously in parallel for some or all of the folders in the favourites list(s) 210, 212. In embodiments the same may be done for some or all of the folders in the main folders list 214.

Preferably the parallel searching, and parallel indications of the number of search results, are triggered in response to only a single entry of the search query by the first user 103a. E.g. the first user 103a types the search term or terms only once, and presses enter only once or clicks or touches the search button only once, and in response this triggers the count of the number of search results to be displayed simultaneously in parallel for some or all of the favourites in the list(s). Or using a voice interface, the first user 103a speaks the search query only once to trigger the parallel searching an parallel indication of results.

The count of the search results for each favourite in the list(s) 210, 212 is displayed in association with the respective entry in the relevant list, e.g. on the right in the same line of text and in the same pane 202 as the respective entry.

The feature is illustrated by way of example in FIG. 2. The first user 103a enters a particular search term or terms into the search field 208 (or other search input means such as a smart speaker). For instance in the illustrated example, the first user 103a searches for the term "Ignite". In response, the search function identifies, individually for each dynamic favourite 212 and/or user-selected favourite 210, which emails and/or IM messages match this search term (e.g. contain this term verbatim, or contain substantively similar content, depending on the search algorithm), and also determines a count of how many such emails and/or IMs are found. The search function then controls the user interface 200 to display the respective count in association with each respective entry in the list(s) 210, 212. E.g. in the example illustrated, four matching emails or IMs are found to have been sent to or from the first user's frequent contact "Dave Example", one email or IM is found to or from another frequent contact "Sue Placeholder", etc. Thus for each entity, the first user 103a is given a count for how many messages there are with the specific search term (or terms). In embodiments all the entities in the left-hand navigation pane 202 will be used as scopes for the search.

If the first user 103a selects (e.g. clicks or touches) one of the entities in one of the lists 210, 212, 214, the search function will then filter down to only items matching the search term from that entity. I.e. when the first user 103a selects one of the people, groups or folders from the dynamic or user-selected favourites list(s) 212, 210, or indeed one of the folders from the main list 214, then a sub-list of the emails and/or IM messages found specifically in relation to that person, group or folder are displayed, preferably in a right-hand pane 204, 206, separately from the left-hand navigation pane 202 (where the lists and associated counts are displayed). E.g. these may be displayed in the form of previews in a right-hand preview pane 204, 206. In some embodiments the email previews are displayed in a first right-hand pane 204 and the IM previews are displayed separately in a second, separate right-hand pane 206 (both right-hand panes 204, 206 being separate and to the right of the left-hand navigation pane 202).

In the case of people, the above described mechanisms advantageously assist the first user 103a to efficiently filter down to the most relevant search results by bringing out those results from people he/she interacts with most frequently. Similarly in the case of folders, the above-described mechanisms advantageously enable the first user to keep on top of the areas or topics that are most relevant to him or her. For instance at least one of the folders may be a user-defined folder to which emails are forwarded or copied on condition of a certain user-defined rule set by the first user 103a, e.g. a rule specifying that emails containing a term or terms relating to a certain project the first user 103a is involved with are to be forwarded or copied to the folder in question.

In general the search results (and corresponding count) may comprise unread items only, or may comprise both read and unread items (where "read" items are any emails or IM messages that have been opened, i.e. viewed, and does not necessarily limit to emails and IMs containing text). In the latter case, embodiments may employ a "seen/unseen" model to attract the first user's attention toward the unseen items (i.e. unviewed, or "unread", emails or IM messages). I.e. in the preview unread emails and/or IM messages are displayed more prominently or emphatically then those that have been read, e.g. by displaying the title or sender name bolder or in a different colour than for read items.

It will be appreciated that the above embodiments have been described by way of example only. Other variants may become apparent to a person once given the disclosure herein. The scope of the present disclosure is not limited by the described embodiments but only by the accompanying claims.

The invention claimed is:

1. A method comprising:
  accessing a record of past communications between a first user and a plurality of other users;
  from amongst a set of entities, identifying a subset as preferred entities of the first user, wherein at least some of the preferred entities are identified automatically based on one or more factors including at least a frequency of interaction between the first user and each of the entities, the entities with which the first user has a greater frequency of interaction being given a greater preference in said automated identification, wherein the set of entities comprises a plurality of parties, each party comprising at least one user;
  independently of receiving any search queries, causing a graphical user interface to selectively display a list of the preferred entities distinguishing them from amongst the rest in the set prior to the received search query being entered by the first user;
  receiving, from the first user, a search query to perform on the record of past communications;
  in response to the search query, causing the graphical user interface to display search results and respective counts of the number of search results associated with each preferred entity;
  receiving, from the first user, a selection of a preferred entity from the list of preferred entities; and
  based on the received selection of the preferred entity, causing the graphical user interface to display to the first user a filtered-down list of the past communications from said record, the past communications of the filtered-down list being some or all of the past communications between the first user and the selected preferred entity and are a subset of search results corresponding to the received search query.

2. The method of claim 1, wherein the past communications comprise emails or IM messages.

3. The method of claim 1, wherein some or all of said set of entities are different respective parties each comprising one or more of said other users, and at least some of the preferred entities are preferred ones of the parties, each of the parties being either an individual one of said other users or a group of multiple of said other users.

4. The method of claim 3, wherein the past communications in said record are stored amongst a plurality of folders, and the search results are found from amongst multiple of the folders.

5. The method of claim 1, wherein the past communications in said record are stored amongst a plurality of folders; and wherein some or all of said set of entities are different respective ones of said folders, and at least some of the preferred entities are preferred ones of the folders.

6. The method of claim 5, wherein the different folders include at least one user-defined folder to which emails are forwarded according to a user-defined rule defined by the first user.

7. The method of claim 1, wherein one or more of the preferred entities are selected manually by the first user.

8. The method of claim 1, wherein the display of the count of the number of search results is performed automatically in response to a single entry of the search query by the first user.

9. The method of claim 1, wherein said one or more factors further comprise a hierarchical status of the entity.

10. The method of claim 1, wherein the count includes only unread communications.

11. The method of claim 1, wherein the count includes both read and unread communications.

12. The method of claim 1, wherein the graphical user interface comprises a navigation pane and at least one preview pane separate from the navigation pane, the list of preferred entities being displayed in the navigation pane, and the filtered-down list of emails or IM messages being displayed as previews in the at least one preview pane.

13. The method of claim 12, wherein the navigation pane also comprises an unfiltered list of folders, the list of preferred entities being displayed in the navigation pane separately to the unfiltered list.

14. The method of claim 12, wherein the navigation pane is a left-hand navigation pane of the graphical user interface, whilst the at least one preview pane is displayed to the right of the navigation pane in the graphical user interface.

15. The method of claim 12, wherein the associated counts are displayed in the navigation pane alongside the respective entities in said list of preferred entities.

16. The method of claim 12, wherein the emails or IM messages are both emails and IM messages, the at least one preview pane is multiple preview panes, and the preview of the emails is displayed in a separate preview pane than the IM messages.

17. The method of claim 1, wherein the list of preferred entities are identified manually by the first user.

18. The method of claim 1, wherein the search queries are received from the first user from a voice interface using speech recognition technology.

19. One or more computer storage hardware media storing computer-executable instructions that are executed by a computing device to implement a method comprising:
 accessing a record of past communications between a first user and a plurality of other users;
 from amongst a set of entities, identifying a subset as preferred entities of the first user, wherein at least some of the preferred entities are identified automatically based on one or more factors including at least a frequency of interaction between the first user and each of the entities, the entities with which the first user has a greater frequency of interaction being given a greater preference in said automated identification, wherein the set of entities comprises a plurality of parties, each party comprising at least one user;
 independently of receiving any search queries, causing a graphical user interface to selectively display a list of the preferred entities distinguishing them from amongst the rest in the set prior to the received search query being entered by the first user;
 receiving, from the first user, a search query to perform on the record of past communications;
 in response to the search query, causing the graphical user interface to display search results and respective counts of the number of search results associated with each preferred entity;
 receiving, from the first user, a selection of a preferred entity from the list of preferred entities; and
 based on received selection of the preferred entity, causing the graphical user interface to display to the first user a filtered-down list of the past communications from said record, the past communications of the filtered-down list being some or all of the past communications between the first user and the selected preferred entity and are a subset of search results corresponding to the received search query.

20. A computer system comprising storage and processing apparatus, the storage comprising one or more storage devices and the processing apparatus comprising one or more processing units, wherein the storage stores code arranged to run on the processing apparatus and being configured so as when thus run to perform operations of:
 accessing a record of past communications between a first user and a plurality of other users;
 from amongst a set of entities, identifying a subset as preferred entities of the first user, wherein at least some of the preferred entities are identified automatically based on one or more factors including at least a frequency of interaction between the first user and each of the entities, the entities with which the first user has a greater frequency of interaction being given a greater preference in said automated identification, wherein the set of entities comprises a plurality of parties, each party comprising at least one user;
 independently of receiving any search queries, causing a graphical user interface to selectively display a list of the preferred entities distinguishing them from amongst the rest in the set prior to the received search query being entered by the first user;
 receiving, from the first user, a search query to perform on the record of past communications;
 in response to the search query, causing the graphical user interface to display search results and respective counts of the number of search results associated with for each preferred entity;
 receiving, from the first user, a selection of a preferred entity from the list of preferred entities; and based on received selection of the preferred entity, causing the graphical user interface to display to the first user a filtered-down list of the past communications from said record, the past communications of the filtered-down list being some or all of the past communications communicated between the first user and the selected preferred entity and are a subset of search results corresponding to the received search query.

* * * * *